US011259176B2

(12) United States Patent
Dong et al.

(10) Patent No.: US 11,259,176 B2
(45) Date of Patent: Feb. 22, 2022

(54) METHOD OF AND A SYSTEM AND NODE DEVICE FOR LOCATING INFORMATION AVAILABLE AT A NODE DEVICE IN A NETWORK OF COMMUNICATIVELY INTERCONNECTED NODE DEVICES

(71) Applicant: SIGNIFY HOLDING B.V., Eindhoven (NL)

(72) Inventors: Peiliang Dong, Eindhoven (NL); Zhizhong Zhang, Eindhoven (NL); Weiwei Lu, Eindhoven (NL); Junjun Zhang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 70 days.

(21) Appl. No.: 16/764,925

(22) PCT Filed: Nov. 29, 2018

(86) PCT No.: PCT/EP2018/083007
§ 371 (c)(1),
(2) Date: May 18, 2020

(87) PCT Pub. No.: WO2019/110417
PCT Pub. Date: Jun. 13, 2019

(65) Prior Publication Data
US 2020/0344596 A1    Oct. 29, 2020

(30) Foreign Application Priority Data
Feb. 8, 2018    (EP) .................................... 18155784

(51) Int. Cl.
*H04W 4/00*    (2018.01)
*H04W 8/26*    (2009.01)
(Continued)

(52) U.S. Cl.
CPC ............... *H04W 8/26* (2013.01); *H04W 4/80* (2018.02); *H04W 8/005* (2013.01); *H04W 28/02* (2013.01); *H04W 40/244* (2013.01); *H04W 84/18* (2013.01)

(58) Field of Classification Search
CPC ......... H04W 8/26; H04W 4/80; H04W 28/02; H04W 8/005; H04W 40/244; H04W 84/18; H04W 8/00; H04W 40/24
(Continued)

(56) References Cited

U.S. PATENT DOCUMENTS 7,545,811 B2    6/2009    Taha
8,149,715 B1 *    4/2012    Goel ..................... H04L 45/123
370/238

(Continued)

FOREIGN PATENT DOCUMENTS

CA    2970362 A1    12/2017

OTHER PUBLICATIONS

Pingping Lin, "Determining the Relative Position of a Device in a Wireless Network with Minimal Effort", Eindhoven University of Technology, Eindhoven, The Netherlands, Aug. 2016, pp. 1-79.

*Primary Examiner* — Marceau Milord (57) ABSTRACT

A node device (4) in a network (1) of communicatively interconnected node devices (4) having limited data processing and storage resources, such as a mesh network (1) of node devices (4), receives an inquiry message of the type 'find the best match' for information to be located at a node device (4). The inquiry message comprises benchmark data relating to the information to be located. The receiving node device updates the message based on a comparison of the content in the latest received message and the node's locally stored information. The locally stored information is derived from previous received messages from other node devices (4) in the network (1) and information available at the
(Continued)

receiving node device. When no update is required, no message is broadcasted by a node device (4) and the local copy at the node devices involved converges in a few broadcasts to a static content from which the information sought can be located in the network (1).

15 Claims, 4 Drawing Sheets (51) Int. Cl.
*H04W 4/80* (2018.01)
*H04W 28/02* (2009.01)
*H04W 8/00* (2009.01)
*H04W 40/24* (2009.01)
*H04W 84/18* (2009.01)

(58) Field of Classification Search
USPC .................................................. 370/338, 254
See application file for complete search history.

(56) References Cited

U.S. PATENT DOCUMENTS

| | | | | |
|---|---|---|---|---|
| 8,279,778 | B2* | 10/2012 | Shuey | G01D 15/00 |
| | | | | 370/259 |
| 8,553,561 | B1* | 10/2013 | Chokshi | H04L 45/122 |
| | | | | 370/238 |
| 9,146,725 | B2 | 9/2015 | Nolterieke et al. | |
| 9,489,193 | B2 | 11/2016 | Reynolds | |
| 9,602,390 | B2* | 3/2017 | Yamada | H04L 45/124 |
| 9,930,604 | B2* | 3/2018 | Floberg | H04L 43/16 |
| 10,178,638 | B1* | 1/2019 | Stamatakis | H04W 56/002 |
| 10,422,650 | B2* | 9/2019 | Barnard | H04W 4/38 |
| 10,499,312 | B2* | 12/2019 | Yeh | H04W 40/34 |
| 2006/0045064 | A1* | 3/2006 | Qin | H04L 45/306 |
| | | | | 370/351 |
| 2008/0025330 | A1* | 1/2008 | Wang | H04L 63/0428 |
| | | | | 370/406 |
| 2008/0291855 | A1* | 11/2008 | Bata | H04W 84/18 |
| | | | | 370/311 |
| 2011/0019587 | A1* | 1/2011 | Wang | H04W 4/02 |
| | | | | 370/254 |
| 2011/0021153 | A1* | 1/2011 | Safavi | H04B 17/345 |
| | | | | 455/63.1 |
| 2011/0090885 | A1* | 4/2011 | Safavi | H04W 72/082 |
| | | | | 370/338 |
| 2014/0219091 | A1* | 8/2014 | Hellhake | H04L 45/32 |
| | | | | 370/235 |
| 2014/0354161 | A1 | 12/2014 | Aggarwal et al. | |
| 2015/0110108 | A1* | 4/2015 | Jacob | H04L 47/829 |
| | | | | 370/392 |
| 2015/0369618 | A1* | 12/2015 | Barnard | G01C 21/34 |
| | | | | 701/491 |
| 2016/0021599 | A1* | 1/2016 | Fitzek | H04L 12/6418 |
| | | | | 370/310 |
| 2017/0214604 | A1* | 7/2017 | Qiao | H04L 45/12 |
| 2018/0027472 | A1* | 1/2018 | Qiao | H04W 4/06 |
| | | | | 370/312 |
| 2018/0302294 | A1* | 10/2018 | Diancin | H04L 41/147 |
| 2018/0324609 | A1* | 11/2018 | Diancin | H04L 47/823 |
| 2018/0375723 | A1* | 12/2018 | Ribeiro, Jr. | H04W 12/08 |

* cited by examiner

METHOD OF AND A SYSTEM AND NODE DEVICE FOR LOCATING INFORMATION AVAILABLE AT A NODE DEVICE IN A NETWORK OF COMMUNICATIVELY INTERCONNECTED NODE DEVICES

CROSS-REFERENCE TO PRIOR APPLICATIONS

This application is the U.S. National Phase application under 35 U.S.C. § 371 of International Application No. PCT/EP2018/083007, filed on Nov. 29, 2018, which claims the benefits of European Patent Application No. 18155784.4, filed on Feb. 8, 2018, and Chinese Patent Application No. PCT/CN2017/11458. These applications are hereby incorporated by reference herein.

TECHNICAL FIELD

The present disclosure generally relates to networks of communicatively interconnected network node devices, and more particularly to a method and system for locating information available at a node device in a such a network.

BACKGROUND

In commercially available intelligent lighting systems, also called smart lighting systems, for example, the lighting devices are controlled by communicatively interconnected control devices, operating as node devices in a network of communicatively interconnected node devices, such as a mesh network. That is, luminaires, luminous wall panels, sensors, switches and the like may operate as node devices in a network.

A mesh network is typically characterized by a network topology in which each node device relays or routes data for the network. The mesh node devices cooperate in the distribution of data in the network and may store information available for itself or for another node device of the network. Hence, a node device may also act as information provider by sharing the information available with another node device. Mesh networks may be centralized, i.e. having a central node device or gateway node device, also called bridge device or main-controller node device, or may operate in a non-centralized mode, not having a powerful central or control node with sufficient memory and processing power for data storage and control of the data exchange in the network.

For network operation, a node device generally comprises a transceiver, either a wired or wireless transceiver, a processor arranged for data processing, a data storage or memory arranged for storing information and benchmark data pertaining to the information available at the node device, and identification, ID, data identifying the node device.

Usually, the data storage and data processing power capacities of a node device are limited. Node devices like luminaires, sensors and wall panels have a limited on-chip memory and processing power, such that each of them may only store a small part of information. Accordingly, in a non-centralized network, but also in a centralized network operated by a central node of limited capacity, information available or required is distributed and stored at a plurality of the networked node devices. For the system's reliability and robustness, shared information requires several backups in a few different node devices, and each of them may have a version number to distinguish the information available, for example.

Network protocols for exchanging data by networked control devices or node devices are generally available and known as ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (based systems).

In a wireless mesh network, WMN, the node devices may communicate in either one of unicast mode and broadcast mode, using the Bluetooth Low Energy, BLE, mesh protocol or the ZigBee protocol, for example. A so-called combo-node device, with both ZigBee and BLE connectivity, may operate as a temporal bridging node between a mobile phone and a ZigBee-based lighting network, for example.

In a mesh network, an end user or application requiring particular information available in the network, may have to search for a resource whose network address is not known or uncertain. That is, the end user or application has not to find a particular node device but 'the best match' node device or node devices. That is, the node device or node devices best equipped for providing the required information.

In a conventional approach, for finding the best match, the end user or automated application has to (a) collect all node devices forming a candidate for retrieving the information, (b) compare the candidates as to technical properties for delivering the information, for example, and choose the most appropriate source node device, (c) collect the communication and other details from it, and (d) take corresponding actions, such as retrieving the information available. Those skilled in the art will appreciate that the first two steps, (a) and (b), are likely to cause performance issues in the network.

Step (a) is highly possible to generate a large amount of over-the-air network traffic in a very short time, which may overload the communication channel. If the network is running some other functions in parallel, e.g. sensory and/or manual control of lighting, their failure rates and latency may be seriously increased, for example.

Step (b) requires a large amount of memory and sometimes a heavy computing load on the collecting node device. In a mesh network, most node devices, except the gateway/controller of a centralized network, are unlikely to have enough on-chip resources for performing this step.

For location based applications in a mesh network, such as tracking of tags attached to valuable objects, for example, and approaching control, that is controlling an actuator, such as a luminaire, which is near, i.e. approached by, a movable control device, a major difficulty is that the node device to be located or tracked, is usually very simple with very limited computing power and energy supply. It is known to a person skilled in the art that an approaching control involves a movable control device that controls one or a plurality of actuators or luminaires or nodes which are nearest to the movable controller. Consequently, the computation of the application has to be performed by some other nodes in the network. This is different to the normal indoor positioning applications, where a smart phone is usually the locating target.

Object tracking requires that the tags, which are attached to these objects, for example, operate for at least several years. Such low power and low cost tags are usually implemented as a Transmitter, Tx, only devices. Tx-only means that the tag sends out messages only, and never or seldom receives messages from other nodes. The tag just broadcasts its ID data to the neighbouring node devices to claim its existence, leaving the remaining processing to other node devices.

As for approaching control, one may distinguish two different situations: In a first situation, the control device is powerful enough to communicate with each of the neighbouring node devices, selects one of them, for example by a user of the control device or automatically, and performs some actions. In such a case, there is not much communication and processing difficulties to handle. However, in a second situation, wherein the control device is very simple with very limited computing power and energy supply, such as, for example, a ZigBee Green Power device like a Hue Tap, which is a Tx-only device as well, the main processing has to be performed by other node devices in the network.

For a dense network, i.e. having a large number of networked node devices, such as in lighting networks, it is quite usual that a number of node devices, typically more than ten, receive a same message from an object-tracking tag or an approaching controller. However, three to five static node devices are enough to locate a tag, and only one node device is needed to process the control command from an approaching controller. Therefore, there is a need for a mechanism for the network node devices to negotiate and select one or several best suitable node devices for performing the operations that are required to locate a tag, for example.

In present mesh networks, such as ZigBee, this mechanism does not exist at network level. A straightforward way to solve this is that all the possible candidate node devices, i.e. those who have received the initial message from the tag or the controller, report their information to a central node device, such as the gateway or a bridge device, and let the central node device to make the selection or perform the required processing. Such a method generates a lot of unnecessary messages which may slow down the processing time and affect other applications in the network due to its waste of communication channel bandwidth.

As mentioned above, node devices in the network may locally store distributed information available or required by an application in the network. Consequently, when the application needs an item of this distributed information, it has to inquire the whole network to find which node devices store the information or part of the information required, and which ones have the latest version, for example. This is similar to the challenges in the location based applications described above, where a number of node devices may reply to an inquiry and the application node device has to compare and find the appropriate candidate or candidates from a long list of possible candidates.

An even more challenging situation in a mesh network comprised of simple devices is that an application is going to add some new items of information into the network, and has to find one or a few suitable node devices to store this new information. Here the term 'suitable' means enough free memory space and in or very close to the node devices where the information will be needed in the future. Obviously, the number of candidate node devices for locally storing the information may in this case be large, especially for a newly created network, as nearly every node device may qualify as a candidate. Accordingly, it is highly likely that in this case the communication channel in the network would be overloaded.

In mesh networks such as ZigBee, Thread and BLE Mesh, for example, the Over-The-Air, OTA, upgrade of operating data or software at network node devices generally takes a very long time, due to the limited communication bandwidth and processing capacities of the networked node devices. Typically, upgrading one node device may take about several minutes to tens of minutes, depending on the upgrade image size and the busyness of the network. It may take in total several hours or even a couple of days to upgrade every node device in a large network with over one hundred node devices, for example. Those skilled in the art will appreciate that such a long update time may be inappropriate to meet end user's requirements.

A straightforward way to speed up the upgrade is to broadcast the upgrade image to all targeting node devices at the same time, or in groups, for example. But this is generally not applicable in practice, because it is too difficult or even impossible, to check whether and how many information parts or data packets of an upgrade have been missed by the node devices due to interference, for example. During such grouped OTA upgrade, the source node device sends out the image file by a very long series of broadcast packets. It is quite usual in practice that different node devices will miss different packets. It takes a lot of time and effort for the source node device to establish a list of serial numbers of those missed packets which need to be retransmitted, for example.

U.S. Pat. No. 7,545,811B2 discloses a communication method in a mesh network wherein message data may be dynamically altered in order to deliver to a destination address. The drawback of this method is, however, that information may be retrieved only from node devices whose network address is known. This method, for example, cannot be used to locate the position of node devices or tags in network that meet certain or desired criteria, however the network addresses of which are not know.

Therefore, there is a need for providing a method for locating information available at node devices in a network of communicatively interconnected node devices, such as a mesh network, comprising a plurality of communicating node devices. The term information has to be construed in its most broadest sense, such as identification data of object tracking tags available at a node device, for locating a tag; upgrade data and/or information of missed data packets, to identify and collect a missing part list for grouped OTA upgrade, for example; information of resources available at a node device; information for performing additional functionalities of approaching control, etc.

SUMMARY

It is an object of the present disclosure to provide a method for efficiently locating information available in a network of communicatively interconnected node devices, such as a node devices operating in a mesh network, for eventually retrieving the information or part of the information available at a node device. It is a further object to implement such a method while avoiding significant signalling overhead in the network, and utilizing minimal or at least a minimum as possible resources of the node devices forming the network.

Accordingly, in a first aspect of the present disclosure, there is provided a method of locating information available at a network node device in a network of communicatively interconnected node devices, wherein a node device comprises information to be located, benchmark data pertaining to the information and ID data identifying the node device.

The method comprising the steps of:

a) receiving, at a node device of the network, an information location inquiry message, the inquiry message comprising ID data identifying information to be located and a listing of candidate node devices of the network having information to be located by the inquiry message, the received listing comprising ID data identifying a candidate node device and benchmark data pertaining to the information to be located available at a respective candidate node device;

b) starting an inquiry process, at the receiving node device, based on the received inquiry message, by updating the received listing based on the benchmark data of the received listing and benchmark data pertaining to the information to be located available at the node device, the updated listing comprising ID data identifying the node device and benchmark data pertaining to the information to be located available at the node device;

c) storing the updated listing at the node device, and d) broadcasting, by the node device, the inquiry message comprising the stored listing.

The proposed method is based on the exchange, between receiving node devices in the network, of inquiry messages for the information to be located. The inquiry message comprising ID data identifying the information that is to be located, and a listing of candidate node devices with ID data identifying respective candidate node devices that qualify for providing or contributing to the information to be located. Candidate node devices qualify according to benchmark data relating to the particular information to be located. At the start of the inquiry, an initiating node device evaluates the benchmark and creates a listing of candidate node devices available at the initiating node device based on the information to be located.

If a node device, receiving the inquire message, determines from its own benchmark data and the benchmark data received with the listing of candidate node devices whether it qualifies as a candidate node device, for example, the receiving node device updates the listing of candidate node devices by including its ID node device data and relevant benchmark data in the listing of candidate node devices, stores the updated listing of candidate node devices in its data storage, and broadcasts the inquiry message with the stored listing of candidate node devices in the network. A receiving node device that does not qualify according to the benchmark data, will only store the received candidate node device listing and broadcast the stored listing.

That is, at a receiving node device, based on the inquiry message received, an inquiry process is started or triggered by which an updated listing of candidate node devices is prepared and stored, and a received listing of candidate node devices is matched with a stored listing of candidate node devices, and in case of a match no updated listing of candidate node devices is established.

As long as the node device with respect to a respective inquiry process receives a listing of candidate node devices that differs from the listing of candidate node devices presently stored at the node device, the process of updating the listing of candidate node devices, and broadcasting the inquiry message with the stored listing is repeated at the receiving node device. As soon as there is a match of the received and stored listings of candidate node devices for a respective inquiry process at the node device, no further updates of the listing of candidate node devices is required, and the process may be terminated. The listing eventually stored in the node device indicates the location, i.e. the ID data of the node device, where the desired information may be found and can be retrieved from.

The method provides the 'best matching' of node devices that can contribute to the information to be located. Node devices that do not qualify to be included in the listing of candidate node devices may not take part in the network message exchange, such that not only overloading of the communication channel in the network is effectively avoided, but also waste of scarce resources at such a node device is avoided, thereby not impeding the operation and normal process handling at a node device.

Within the scope of the present disclosure, the term 'benchmark data' is to be understood as any data which may characterize the information to be located. For example, the benchmark data may be a Received Signal Strength Indicator, RSSI, value of a signal received from a tag in an object or asset tracking application, for example. Alternately, the benchmark data may comprise the storage space available at a node device, or a data processing capability available at a node device. In another option, the benchmark data may indicate the presence or absence of a particular file relating to an upgrade within the network, for example in an Over-The-Air, OTA. upgrade process of node devices. The person skilled in the art will appreciate that the above mentioned data are merely exemplary and are not to be construed as being limitative to the field of application of the present disclosure.

The proposed method qualifies for being implemented as a so-called cross-layer protocol. That is, the processor controlled data processing, data storage and exchange of messages and information to be located in a node device is configured in accordance with a multi-layered data processing and data transport model, for example based on the well-known Open Systems Interconnection, OSI, model, at least comprising a network layer level and an application layer level. In this cross-layer protocol, the operations pertaining to steps a) and f) of the above-disclosed method are performed at application layer level and the operations pertaining to steps b), c) and d) are performed at network layer level.

In this cross-layer protocol, the network-layer transmission is effectively affected and modified by the application layer. The application-level processing at the network node devices dynamically updates the broadcast content of the inquiry message, while the network-level processing distributes the inquiry message across the network. Accordingly, the network layer processing may cancel lots of unnecessary or redundant message re-transmissions according to the application-layer's computing, such that the network bandwidth can be consequently saved for other applications, for example.

This mechanism is different from known multi-layer network protocols such as ZigBee, where the network layer and the application layer are relatively independent—i.e. the network layer is in charge of transmitting messages from source node devices to destination node devices, and it never changes the contents of the messages. The application layer only cares about the contents and leaves the data exchange and transmission handling to the lower layers.

On the contrary, with the above disclosed 'find the best matching'—node device or resource in the network, the proposed cross-layer protocol allows the network layer to dynamically update the content of a message transmitted across the network, such as over-the-air in a wireless transmission network, according to an application-level processing that compares the candidate listing content of the latest received message and the node's locally stored listing of candidate node devices for a respective inquiry process.

A further benefit of this cross-layer protocol is that the information from different node devices can be compared and aggregated at the node devices during the propagation of the message across the network. The traffic load on the communication channel and the lasting time to perform the searching process can thereby be significantly shortened.

The listing of candidate node devices of an inquiry message may be replaced by an aggregated payload, which summarises the resources hold by the candidate network node devices. As for an aggregated payload, it is a data set which is able to combine the resource information from individual network node devices to a much shorter data size and in a summarised manner, for solving the challenge of collecting a list of missing information parts after an OTA upgrade by broadcasts across the entire network or across groups of node devices. That means, the source node device of the OTA upgrade sends out the upgrade image file by a long series of broadcast data or information packets, then the source node device has to know which parts have been missed by one or a few node devices in the network, so that the source node device may resend the missing packets only.

The aggregated payload may comprise a bitmap of the image file, i.e. each of the data packets in which the image file is divided, is represented by a corresponding bit in the aggregated payload data. Any missing parts can be labelled on the bitmap as the missing-part list. After enough message exchange among the network node devices, like the listing of candidates elucidated above, the on-going aggregated payload will be transformed in a static version that does not change anymore, and which is the final bitmap which represents every missing part by the network node devices. Instead of a bitmap of a set of resources, any other aggregate-able representation of resources may be applied.

In the case of object tracking, for example, wherein a terminal device, such as tag of a tracked object reports its existence periodically in the network, the location of the tag may need to be obtained each time one or a number of the network node devices receives the existence or beacon message of the tag. The node devices may report the existence message to a central control server, for example. However, with the present method, the node devices that have received the existence message can be efficiently located by establishing, at an initiating node device that should locate the terminal device, an inquiry message comprising a blank listing of candidate node devices.

As the existing message of a terminal device is typically received at node devices in the neighbourhood of each other, broadcasting the blank listing by the initiating node device will cause updates of the listing with the receiving node devices and, eventually, the initiating node device will comprise a list of all the node devices available for preparing accurate positioning of the terminal device. The benchmark data, among others, will comprise a timestamp indicating the time of receipt of the existence message of the terminal device, as well as RSSI-data relating to the signal strength of the received existence message. A node device that receives a stronger incoming message should have a higher RSSI of this message.

If only a small number of node devices in the network have received an existence message of the terminal device, the location process will quickly stop as just a few updated candidate node device listings will broadcasted, such that the best location of the terminal device is within the surroundings of the initiating node device.

After sending an existence message, the terminal device may go to sleep mode to save energy.

In practice, the transfer of the inquiry message across the network may be limited to node devices that are neighbours of the initiating node device. Such as in the above example of object tracking. In another embodiment of the method, the inquiry message is established at an initiating node device comprising ID data identifying the initiating node device, and the inquiry message is broadcasted comprising ID data identifying the broadcasting node device, wherein an updated listing of candidate node devices is established at a receiving node device only in case the ID data of the initiating node device and the ID data of the broadcasting node device of the inquiry message are identical. This 'neighbours only' mode of operation effectively reduces unwanted message traffic in the network, not contributing to the location of the information sought.

It will be understood that when a non-neighbouring node device starts the inquiry process and if the 'neighbours only' option is not applied, the candidate list should be blank when the inquiry message is initiated.

When the process has finished, and the 'neighbours only' option is applied, the node device which has updated the listing of candidate node devices first should send the listing to a control server or to a gateway node device of the network, for the calculation of the terminal or tag position from the neighbouring node devices and their corresponding geographical coordinates in the network. When the process has finished, and the 'neighbours only' option is not applied, the gateway node device may have already received the candidate list during the location process.

If the network node devices are installed very sparsely, the neighbours only option could result in two or more sub-groups of neighbouring node devices obtaining different results. But this can be easily solved at a control server side, for example. That is, the server receive a small number of different results from different node devices may combine and truncate the results.

To further reduce the communication load in the network, the listing of candidates may be limited to comprise a maximum number of candidate node devices to be included in the listing. For the calculation of the position of a terminal device, such as an object tag, the maximum number of candidates in a listing is recommended to be at least three. This option significantly reduces the number of messages circulating in the network, especially when the network size is not small (e.g. >50 nodes).

Approaching control may be considered as a variant of the above-disclosed object tracking, where a remote controller replaces the terminal device or tag on the tracked object. Rather than obtaining the location of the terminal device or tag, the selected candidate(s) executes a command from the remote controller. Usually, the maximum number of candidates is set to one for this application.

In a further embodiment of the method according to the present disclosure, the listing of candidate node devices further may comprise payload data pertaining to content of the information to be located and available at a candidate node device. The payload data may comprise actions that have to be performed at a node device once the location process has finished, for example relating to the retrieval of the information content located, or a node device may record its own geographical coordinates and put them as payload data in the candidate node device listing. In the latter case, for calculating the location of an object, for example, a network gateway and/or control server may obtain the coordinates directly from the candidate list rather than to inquire an additional database of node coordinates, for example.

In another embodiment of the method according to the present disclosure, the inquiry message, for example in the listing of candidate node devices or in the benchmark data thereof, may comprise at least one parameter for controlling processing of the inquiry message in an inquiry process at a node device of the network. Such a parameter or parameters may relate to the required processing power available at a node device for data processing of information and/or required storage capacity for distributed storage of information locally at a node device, the available time to process a message, a message sequence number, a timestamp of the message, etc.

In an embodiment of the method according to the present disclosure, the inquiry message comprising the stored listing is broadcasted by a node device after a waiting time. This to avoid collision of inquiry messages relating to a particular inquiry process at a receiving node device. This waiting time or delay time to transmit an inquire message by a receiving node device comprising the locally stored listing of candidate node devices may, in accordance with an embodiment of the disclosed method, be randomly set among the node devices in the network, in order to differentiate the transmission time of different node devices.

Optionally, in accordance with another embodiment, the waiting time may be set based on the benchmark data of a node device included in the listing of candidate node devices in the inquiry message to be broadcasted. The waiting time can be prioritised according to the newly updated benchmark values, for example. That is, those candidate node device listings with better benchmarks in view of the information to be located, should have shorter delay times while those with worse ones should have longer delay or waiting times. This is to make the information from those highly-potential candidates to spread more quickly over the network.

In a further embodiment, after broadcasting, by a node device of an inquiry message comprising an updated listing, another information location inquiry message of the respective inquiry process may be received by the respective node device after a set time period, and the respective inquiry process at a node device is terminated when no further inquiry messages are received by the node device within the set time period.

The time period should be set at a long-enough value to automatically terminate the method on each node device. The time period is to be refreshed or reset when the contents of the inquiry messages have been updated.

It will be appreciated that the method according to the present disclosure may comprise further options, such as combining, sorting and truncating received and stored listings of candidates according to the relevant benchmark data, for example.

Processor controlled data processing, data storage and exchange of messages and information to be located in a node device may be configured in accordance with a multi-layered data processing and data transport model. Such a model at least comprises a network layer level and an application layer level, and the method according to present disclosure may be performed as a cross-layer protocol.

In a second aspect of the present disclosure, there is provided a system comprising a network of communicatively interconnected node devices, a node device comprising a processor arranged for data processing, a data storage arranged for storing information, benchmark data pertaining to the information, ID data identifying the information, ID data identifying the node device, and a listing of candidate node devices relating to an inquiry process, and a transceiver, wherein the node devices are operatively arranged for performing the method disclosed above.

In an embodiment of the system, in particular in a centralized system or network, at least one of the node devices is arranged as a gateway node device, arranged for operating as an initiating node device of the system.

A node device arranged for operating in the system according to the present disclosure may be in particular arranged for operating in accordance with one of a ZigBee and a Bluetooth Low Energy, BLE, data processing protocol, for operation in a networked system of lighting devices, including node devices comprised of lighting armatures or fixtures, sensors, switches, etc., for example.

In a third aspect of the present disclosure, there is provided a computer program product, comprising a computer readable storage medium storing instructions which, when executed on at least on one processor, cause the at least one processor to carry out the method disclosed above. The computer program product may take the form of a non-transitory medium like a memory stick, data disc, and the like, and/or may be provided as a download signal in a network, for example.

These and other aspects of the disclosure will be apparent from and elucidated with reference to the embodiments described hereinafter.

DETAILED DESCRIPTION

It is noted that in the description of the figures, same reference numerals refer to the same or similar components performing a same or essentially similar function.

Figure 1:
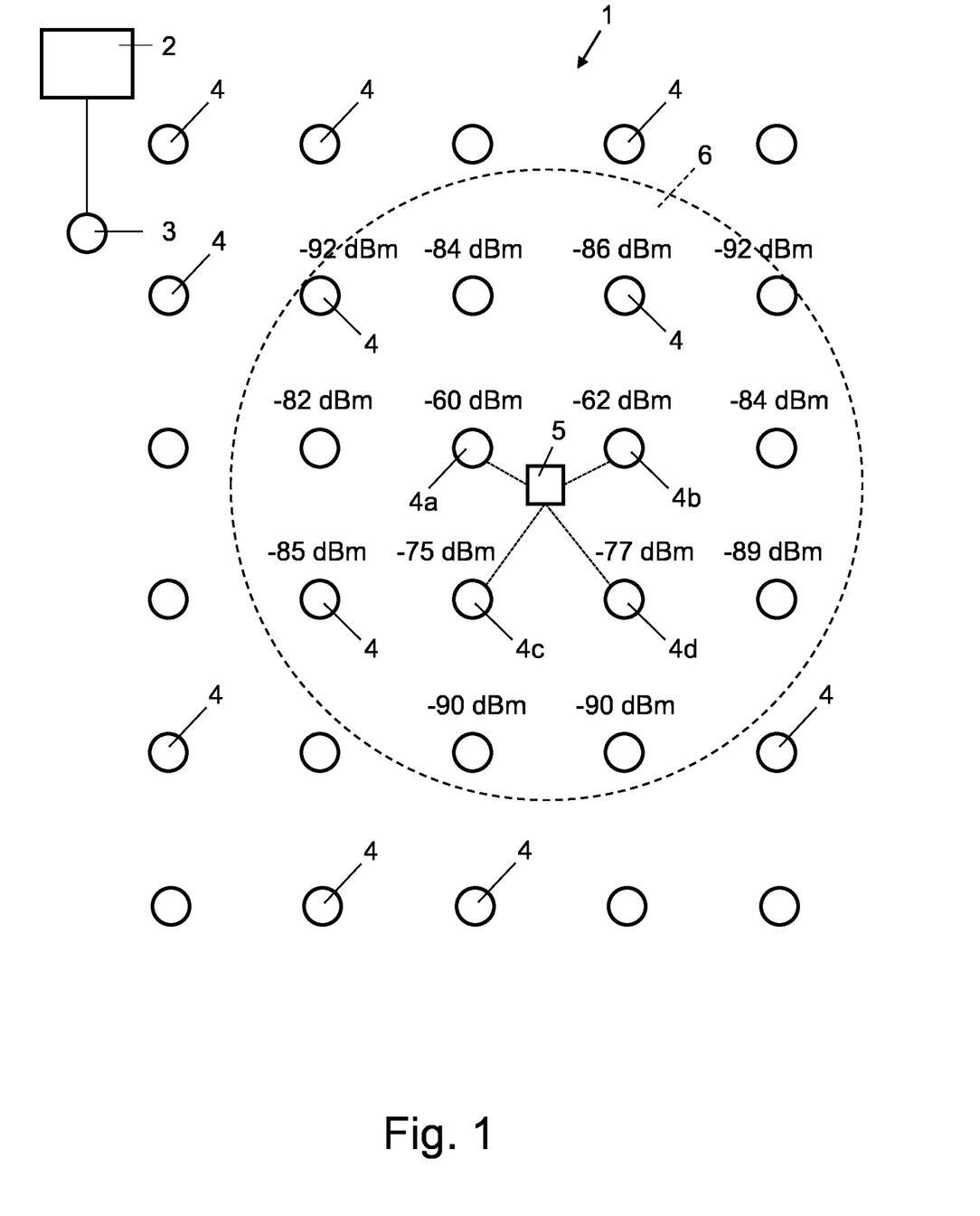
FIG. 1 shows schematically a system comprising a control server and a network of communicatively interconnected node devices including a gateway node device.

FIG. 1 illustrates a system comprising a network 1, such as a mesh network, of a plurality of communicatively interconnected node devices 4. Such an interconnection may either be wired or wireless, and arranged such that a node device 4 at least may exchange data with its neighbouring node devices 4, in a broadcast mode of operation, for example. Embodiments of the present disclosure relate to networks 1 which do not necessarily comprise a central processing node device. The person skilled in the art, however, will appreciate that the teachings of the present disclosure may also be applied to a network having a central processing node device. Furthermore, the node devices 4 may be identical or different, having identical or different (limited) processing and data storage capabilities, and communication possibilities.

The system, in the embodiment shown, further comprises a server 2 on which an application or several applications or a dedicated computer program is running, for example. For the execution of an application at the server 2, for example, it is assumed that information from the network 1 has to be retrieved. The server 2 connects to the network 1 via a gateway node device 3. The gateway node device 3 is often identical to one of the node devices 4, except for the fact that the gateway node device 3 also communicates with the server 2. It will be appreciated that the node devices 4, including the gateway node device 3, do not necessarily have to be fixed or stationary node devices. Rather, the node devices in the network 1 may be mobile and any node device 4 capable of communicating with a server 2 may operate as a gateway node device. For calculating the position of an object in the network 1, for example, the geographical position or coordinates of a node device should be available.

An application to be executed, for example, is to calculate the geographical position of a unit or terminal device 5 that is moving across the network 1 or that is supposed to be stationary in the network 1. In the case of an object, such as a valuable asset, for example, the unit 5 is a tag affixed to the object, usually implemented as transmit only, Tx-only, low power tag. Here, Tx-only means that such tag or unit only transmits messages, such as beacon messages, and never or seldom receives messages from node devices 4. The unit or terminal device 5 may just occasionally or repeatedly broadcasts its identification, ID, data to the neighbouring node devices 4 in the network, such as the network node devices designated 4a, 4b, 4c and 4d in FIG. 1. This, to claim its existence or alive state, leaving the remaining processing to the node devices. The unit, tag or terminal device 5 can also be construed as a node device of the network 1, for example.

For calculating the geographical position of the unit or terminal device 5, the node devices that are within the communication range of the unit 5, such as the ones neighbouring the unit 5, receive a broadcast existence message or beacon signal from the unit 5. The node devices 4 are arranged to measure the signal strength of a received existence message, indicated by the so-called Received Signal Strength Indicator, RSSI, value. In FIG. 1, the RSSI values measured are indicated at a respective node device 4, expressed in dBm. As can be seen, not only the direct neighbouring node devices 4a, 4b, 4c, 4d receive an existence message of the unit or terminal device 5, but also node devices 4 located at a further distance. In FIG. 1, the node devices 4 located within the dashed encircled area 6 in FIG. 1 all receive an existence value of the unit or terminal device 5. The node devices 4a, 4b, 4c, 4d show the highest RSSI values, such that these nodes qualify best as candidates for calculating the geographical position of the unit 5, for example.

The node devices 4a, 4b, 4c, 4d, that are closest to the unit 5, may now have to be identified based on an inquiry of the highest RSSI values for the particular unit or terminal device 5. In the context of the present disclosure, the RSSI values are termed benchmark data and the ID data of the unit 5 are the information to be located. Therefore, when an application running on the server 2 requests the location of the unit 5, the method according to the present disclosure may return the addresses or ID data identifying the four node devices 4a, 4b, 4c, and 4d, together with their RSSI values as a result. The actual operation of the method for locating the node devices according to the present disclosure will be elucidated below with reference to the description of the relevant figures.

The method according to the present disclosure generally relates to the finding or locating of a node device in the network that best matches or qualifies for retrieving information that is to be aimed at. In the remainder of this description generally called 'Find the Best Match', FBM, method or process.

Generally, at the start of an FBM process, a node device initiating the process evaluates benchmark data available at the node device initiating the process, relating or pertaining to the information to be located, and creates a local listing of candidate node devices—or in short a candidate listing—that may qualify for locating the information required or creates a local aggregated payload, as described in the summary part above, and broadcasts an FBM inquiry message comprising the candidate listing or aggregated payload. For the purpose of locating the unit 5 in FIG. 1, the candidate listing typically comprises the RSSI value as benchmark data and the candidate node devices are identified by the ID data of a respective node device 4.

Every time having received an inquiry message at a receiving node device, the FBM process for a particular information inquiry running on a node device compares the listing of candidate node devices (or aggregated payload) in the message with the local listing of candidate node devices (or local aggregated payload) pertaining to the requested information available at the receiving node device; if necessary, the FBM process updates the local candidate list (or the local aggregated payload) by combining the two lists (or payloads), sorting the items according to their benchmark values, truncates the list to a short-enough length, if applicable, and stores the updated list in the local storage of the receiving node device.

The FBM process at the receiving node broadcasts an FBM inquiry message to its neighbours if:
1. the arriving FBM message is the first one of an FBM process, or
2. there are new updates with respect to the message contents (i.e. the candidate list or the aggregated payload), either updated by the node device itself or some other node devices by means of different message contents.

An FBM inquiry message is broadcasted after a waiting period or waiting time. This waiting time or delay time can be randomly set among the node devices, in order to suitably differentiate the transmission time of different node devices. Optionally, the delay time can be prioritised according to the newly updated benchmark values, to spread highly-potential candidates more quickly over the network. Thus, inquiry messages comprising highly potential candidate devices are broadcasted after a much shorter waiting, or even no waiting at all, i.e. waiting time value zero, compared to less qualifying candidates according to their benchmark data.

The waiting time is to be set sufficiently long to automatically terminate the FBM process on each node device and the waiting time should be refreshed when the contents of the FBM inquiry messages have been updated.

With the above FBM process, the inquiry messages will stabilise to a fixed version before the FBM process has been terminated on every node device. The answer to the 'best matched resource or node device(s)' then resides in the contents of the messages, and each node device involved in the FBM process will have a local copy of the contents before the termination of the process.

Message Format 1:

In an example of an inquire message of the FBM process, the semantics of a typical inquiry message in pseudo-protocol language may take the form of:

FindBestMatch {SrcAddr, SeqN, AppID, [AppOption,]
MaxCandidateNum,
Addr1, Benchmark1, [Payload1,]
Addr2, Benchmark2, [Payload2,]
AddrN, BenchmarkN, [PayloadN]}

Here the parameters in the curly brackets are mandatory, and those in the square brackets are optional. The parameters have the following meaning:

SrcAddr: The address of the network node device that initiates this 'find-the-best-match' (FBM) process.

SeqN: The sequence number of the message, which is generated by the node device who initiates this FBM process, i.e. the node device of SrcAddr. As the contents of the message can be changed during its propagation in the network, SrcAddr and SeqN are the unique marks to identify a FBM process.

AppID: The ID number represents the application which is linked to this FindBestMatch message, i.e. the program of this application is in charge of updating the contents of the message which may be represented by or linked to ID data identifying the information to be located.

AppOption: This is an optional parameter or a set of optional parameters which are required by the application linked to the AppID. These options may be used to limit the number of node devices participating in the FBM process, or to define the calculation method of the benchmarking parameters (Benchmark1, Benchmark2 . . . BenchmarkN), or to define the contents of the payload parameters (Payload1, Payload2 . . . PayloadN).

MaxCandidateNum: the max number of candidate node devices (see below) which can be included in a FindBestMatch message.

The listing or list of candidate node devices takes the form of (Addrn, Benchmarkn, Payloadn), where n can be 1, 2 . . . , MaxCandidateNum.

Addrn: the address of the candidate node device.

Benchmarkn: calculated by the application linked to AppID on the node device of Addrn. This value is used by the network layer to compare the candidates and update the listing of candidate node devices or, in short, candidate listing.

Payloadn: an optional parameter or a set of optional parameters which can be used by the application to perform further actions after the FBM process has finished. This can be omitted if the application would use some other messages to perform the follow up actions, especially when the payload is too long to be included in an FBM message.

As explained above, a candidate node device is a potential node device which has the best matched resource or information for the application at an initiating node which has initiated the FBM process. The list of the candidate node devices in the inquiry message is being changed through its propagation in the network. When the changing stops, the final list gives the answer of which node device or node devices contain the best matched resource.

Message Format 2:

An alternative semantics of an inquiry message in pseudo-protocol language of the FBM process, may take the form of:

Find BestMatch {SrcAddr, SegN, AppID, [AppOption,] Aggregated Payload}

Here the list of candidate node devices is replaced by AggregatedPayload, which is applicable when the targeting resource is not from a particular node device, but some aggregated information from a lot of, or all of the network node devices. Establishing a 'collecting missing-part list' for grouped OTA upgrade, which is elucidated in the summary part above, may apply this format to perform the FBM process.

AggregatedPayload: This parameter is the place for the network node devices to aggregate their local resource information into. It can be a bitmap of a set of resources, or any other aggregate-able representation of the targeting resources.

The FBM process, optionally, may comprise further parameters for controlling the processing of an inquiry message or resources available at a node device, for example, such as:

Constants: The constants are the parameters which are fixed during an FBM process. These parameters may be pre-set to a set of fixed values for all node devices in a network; or put in AppOption so that one FBM process may have a customized set of values. Examples are:

a. $T_w$: Max wait time. This parameter is equivalent to the total lasting time of a normal network-layer broadcast.

b. $T_{mt}$: Max delay time for a message transmission. This parameter is equivalent to the max random delay time of a node device to relay a normal network-layer broadcast message.

FBM Table: This is a table that may be kept by each node device 4 to record and identify on-going FBM processes. The length of the table is determined according to application requirements. Each table item may contain the following parameters from the FBM messages:

a. SrcAddr
b. SeqN

Local variables for each FBM process: each node device should keep a set of local variables for each FBM process until the process has finished. Examples are:

a. $M_{img}$ (Local message image): This is the same as an FBM message, but kept in the local memory.

b. $F_t$: A Boolean variable which indicates an FBM message is to be transmitted on the local node device.

c. $t_t$: The time to transmit a message.

d. $t_f$: The time to finish the FBM process.

Example Procedure A:

Assume the gateway node device 3, shown in FIG. 1, initiates an FBM process by adding a new item to FBM Table. In a next step, $M_{img}$ should be set according to the application requirements, by defining SrcAddr, SeqN, AppID, AppOption, and MaxCandidateNum, if applicable. If Message format 1 is applied, and if the node device is a candidate to the resource matching, the first item of the candidate list is to be filled with the local node device's information. If the local node device is not a candidate, the candidate list may be left blank.

If Message format 2 is applied, AggregatedPayload is rendered according to the local node device's related information. In a subsequent step, a message having the same $M_{img}$ is broadcasted to its neighbours. Its neighbours do not relay the same message as a normal relayed broadcast in mesh networks, but process same according to Procedure-B explained in the following section. Finally, set $F_f$=False, set $t_f$=current time+$T_w$, and end of Procedure A.

Figure 2:
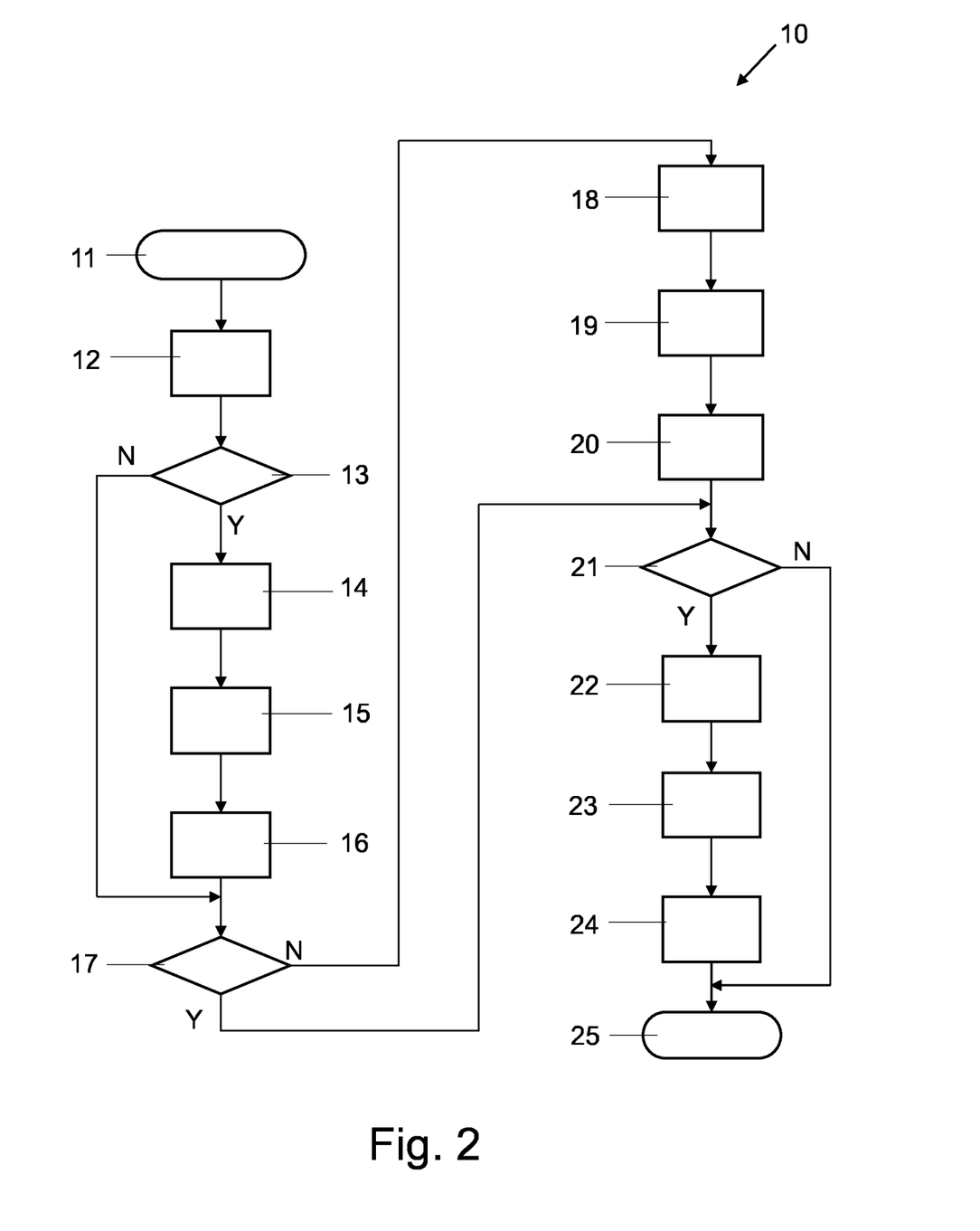
FIG. 2 schematically shows a method of retrieving information according to the present disclosure, illustrated by a flow chart diagram.

Example Procedure B:

Referring now to the flow chart diagram in FIG. 2. The normal flow in time is from the top to the bottom of the diagram. When a node device receives, i.e. block 11, a 'find-the-best-match', FBM, message $M_{in}$, a temporary Boolean variable $F_R$=False is defined in block 12. This Boolean variable indicates whether the incoming message needs to be relayed. In decision block 13, an FBM table is checked to determine whether this is a new FBM process by comparing SrcAddr and SeqN. If yes, result Y, a new item is added to the FBM table, i.e. block 14, and in block 15 $F_t$=False and $F_R$=True is set, and $M_{img}$ is rendered in block 16.

In the step of rendering 16, the local message may be rendered by copying the values of SrcAddr, SeqN, AppID, AppOption, and MaxCandidateNum from $M_{in}$. If Message format 1 is being used, it needs to be checked whether the local node device is a candidate to the resource matching. In the affirmative, the first item of the candidate list is filled with the local node device's information and benchmark data, and when the local node device is not a candidate, the candidate list is left blank. If however, Message format 2 is applied, AggregatedPayload is rendered according to the local node device's related information.

After the step of rendering 16, or if it is determined in decision step 13 that the FBM process is not a new FBM process, i.e. result N, in a next decision block 17 it is checked whether the candidate list (Message format 1) or AggregatedPayload (Message format 2) from $M_{in}$ is the same as the one in $M_{img}$. If they are different, result N, $F_R$=True is set in block 18, and the candidate lists of $M_{in}$ and $M_{img}$ are combined in block 19 into a single list, $L_{cmb}$.

In a next step, block 20, $L_{cmb}$ is sorted according to the values of Benchmarkn. In the case of equal Benchmarkn's, some arbitrary rules should be applied to guarantee an exclusive order of the list items. For example, compare Addrn and put the one with the smaller address value prior to that with a larger one. Subsequently, truncate $L_{cmb}$ so that its length is no longer than MaxCandidateNum and replace the candidate list in $M_{img}$ with $L_{cmb}$. A person skilled in the art, reading the present disclosure, understands that the above mentioned steps relate to the first Message format, i.e., Message format 1, as previously described.

If, however, Message format 2 is applied, the sequence of steps to be followed may be slightly different. In such a case, AggregatedPayload from $M_{in}$ is to be combined with the one in $M_{img}$, and AggregatedPayload in $M_{img}$ should be replaced by the new combined result. This is not illustrated in FIG. 2.

If, in decision block 17, it is determined that $M_{in}$ is the same as $M_{img}$, result Y, it is evaluated in block 21 whether $F_t$ is False and $F_R$ is True. If in block 21 it is determined that $F_t$ is False and $F_R$ is true, result Y, then in block 22 $F_t$=True, and in block 23 $t_t$=current time+DelayFunction ($T_{mt}$, $M_{in}$, $M_{img}$), wherein the parameter DelayFunction ( . . . ) is a function to generate a random or specified delay or waiting time for a new transmission. The details hereof are described below. Finally, $t_f$ is set in block 24 as $t_f$=current time+$T_w$. Procedure B is ended in block 15. If in block 21 it is determined that $F_t$ is not False and $F_R$ is not true, result N, then the Procedure B is directly ended in block 25.

Example Procedure C:
When $t_t$ is due:
Broadcast a message the same as $M_{img}$ to its neighbours, that do not relay the same message as a normal relayed broadcast message in mesh networks, but process it according to Procedure-B, as explained above. Finally, set $F_t$=False, and Procedure C is ended.

Example Procedure D:
When $t_f$ is due.
Remove the current item from the FBM table. If the application on the node device has any follow-up actions, perform the action according to the contents in $M_{img}$, and Procedure-D is ended.

In the above mentioned description, a delay or waiting time is generated by DelayFunction ( ) for broadcasting an FBM message. The simplest implementation is DelayFunction ($T_{mt}$)=Random (0, $T_{mt}$), which means generate a random value between 0 and $T_{mt}$. A more advanced implementation is to prioritize messages which have better benchmark values.

DelayFunction($T_{mt}$,$M_{in}$,$M_{img}$)=Random(0,$T_D$)+($T_{mt}$−$T_D$)($B_{max}$−$B_U$)/($B_{max}$−$B_{min}$)

In this implementation, those newly updated $M_{img}$ with a more competitive result to the FBM process will have a shorter delay time. Therefore, these messages will be propagated across the network earlier, to avoid other less competitive results being transmitted unnecessarily as the receipt of a 'better' candidate listing, for example, will obviate the transmission of an updated candidate listing with less qualifying candidates.

Here, $T_D$ is a value much smaller than $T_{mt}$, and Random (0, $T_D$) generates a small random value to deviate the delay times of different node devices in case their outputs of the later parts of the equations are the same. $B_{min}$ and $B_{max}$ are the minimum (worst) and maximum (best) possible values of Benchmarkn in the FBM messages. $B_U$ is calculated according to $M_{in}$ and $M_{img}$. Assuming that the resource candidate items in $M_{in}$ and $M_{img}$ are sorted from the ones with the best benchmarks to the ones with the worst benchmarks. If $M_{in}$ and $M_{img}$ are different, Bu is set to the benchmark value of the first item in $M_{img}$ which is different to its counterpart in $M_{in}$. If $M_{in}$ and $M_{img}$ are the same, Bu is set to Random ($B_{min}$, $B_{max}$).

Figure 3:
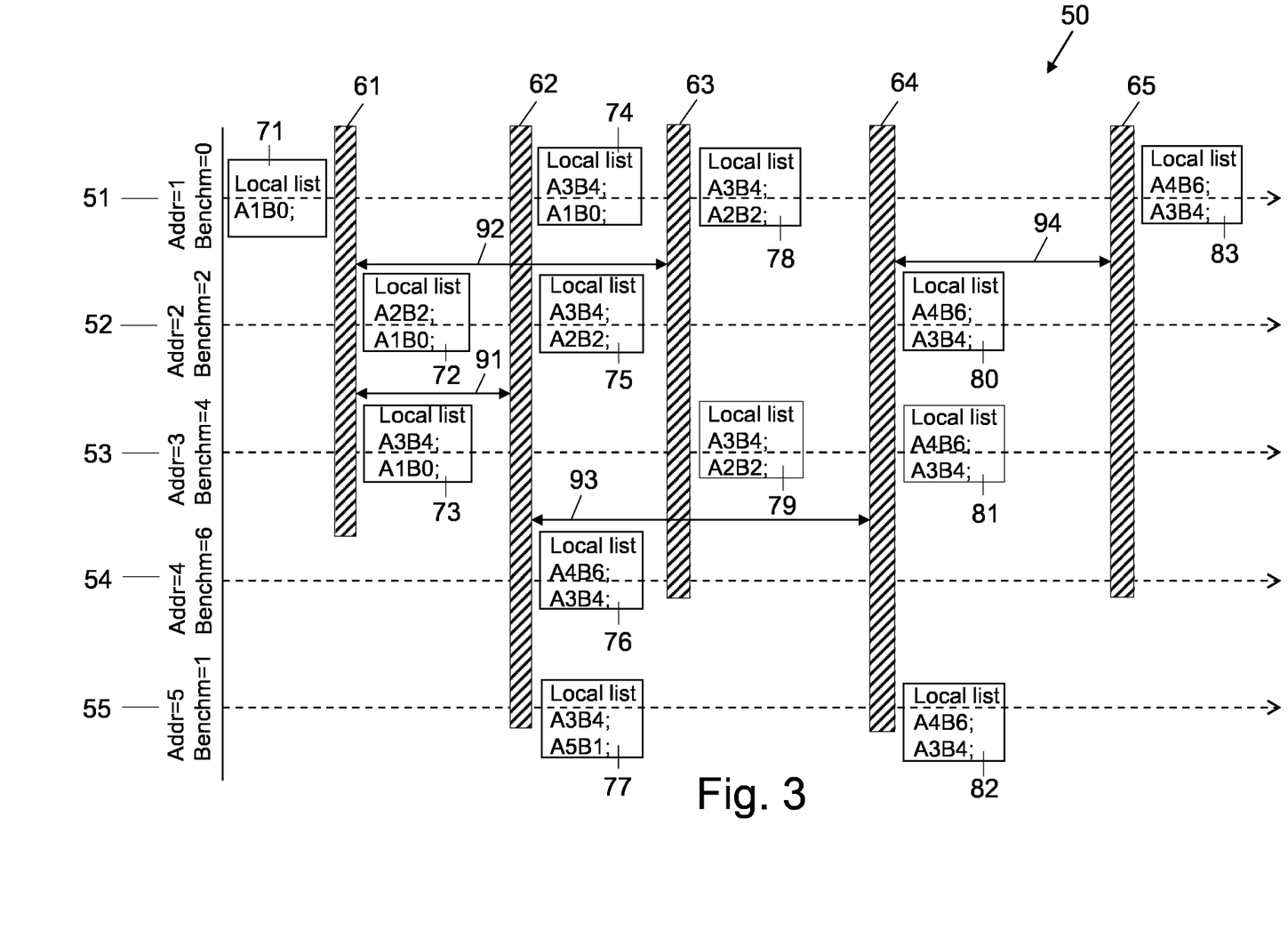
FIG. 3 schematically illustrates a sequence of events in locating information at various node devices of the network according to FIG. 1.

FIG. 3 schematically shows a sequence of events before retrieving information according to the present disclosure. As an example, consider a system comprising five node devices 51-55 having ID data designated Address, indicated by Addr=1, 2, 3, 4, 5. The node devices 51-55 also have a corresponding Benchmark, indicated by Benchm=0, 2, 4, 6, 1, respectively. in FIG. 3. For example, consider node device 53, same has an Address 3 and a Benchmark level of 4. This may be represented as A3B4, wherein A indicates the address and B indicates the Benchmark level. The Benchmark may be an indication of a Received Signal Strength Indicator, RSSI, value or of data storage space available at a node device, etc. For the purpose of this example, it may be understood that a higher value of Benchmark is desirable.

Assume an application running on a network server, like the network server 2 in FIG. 1, to locate two node devices in the network that have the highest value of Benchmark, the candidates. By simply looking at the parameters shown in FIG. 3, the person skilled in the art understands that the node devices with the highest values of benchmark are node device 54 and node device 53 respectively. With the help of the following description, it may be understood how this result is obtained with the method according to the present disclosure, executed by the node devices 51-55, which may be equivalent to the node devices 4 in the network 1 of FIG. 1.

It is assumed that node device 51 is a gateway node device which is connected to the server. When an FBM process is initiated by node device 51, it generates an FBM inquiry message and adds the stored benchmark values available. The initiating node device 51 then broadcasts 61 the inquiry message 71 containing its own address, Addr=1, together with its benchmark value, Benchm=0, forming the candidate listing and ID data identifying the information to be located by the respective FBM process. The message 71 is received by the neighbouring node devices 52 and 53.

Considering node device 52, when the node device 52 receives the broadcast inquiry message 71, it executes the FBM process that renders a local candidate listing comprising itself, and compares this listing with the candidate listing of the received message. Since the node device 52 has a better Benchmark, i.e. Benchm=2, compared to the received Benchmark, the FBM process determines that the received candidate listing needs to be updated. The updated candidate listing comprising the address, Addr=2, and the benchmark value, Benchm=2, of node device 52 is added to the received candidate listing, i.e. A2B2. After updating, the received candidate listing is locally stored at the node device and an inquiry message 72 is established comprising the updated candidate listing to be broadcasted by the node device 52 and ID data identifying the information to be located. The node device 52 waits for a random waiting time 92 before broadcasting 63 the inquiry message 72. As explained earlier, the waiting or delay time may be randomly generated and/or it may be a function of the benchmark value. Node devices with better benchmark values may have shorter waiting times.

Node device 53, after receipt of the inquire message 71, performs a similar operation as described above for node device 52, and generates and stores an updated message 73 including its address, Addr=3, and benchmark value, Benchm=4, A3B4. Node device 53 has a shorter waiting time 91, compared to the waiting time 92 of node device 52, before it can broadcast 62, owing to its higher benchmark value compared to node device 52.

After expiry of the waiting time 91, node device 53 broadcasts 62 the message 73 to its neighbouring node devices. When the node devices 51, 52, 54 and 55 receive the message 73, they compare the candidate listing received with the inquiry message and the locally stored candidate listing, if available.

Consider node device 52, it determines that the candidate listing of the received message 73, i.e. A3B4; A1B0, is not the same as the one that is locally stored, i.e. message 72, A2B2; A1B0. The FBM process at node device 52 then proceeds to update the candidate listing by combining the received listing in message 73 and the local listing for message 72, such that the candidates with the best benchmark values, i.e. A3B4; A2B2, are combined into an updated candidate listing in an inquiry message 75, which updated candidate listing is locally stored at node device 52. When creating an updated listing, in the present example, a node device arranges the information in the order of the benchmark values and it truncates the listing after the first two values, for example.

Consider node device 54, since it has not yet stored a local candidate listing, it likewise puts its address, Addr=4, and benchmark value, Benchm=6, in the candidate list and then arranges the information based on the benchmark value and then truncates the list after the first two entries, resulting in candidate listing A4B6; A3B4, and an inquiry message 76 to be broadcasted. It will be appreciated that node devices 51 and 55 similarly update and store candidate listings and create messages 74, A3B4; A1B0, and 77, A3B4; A5B1, respectively. As the waiting time 92 on node device 52 is already running, node device 52 is very likely to be the next node device to broadcast 63 the inquiry message 75.

It will be appreciated from the figure that node device 54 will be the first or the second one to broadcast 64, owing to its higher benchmark values, and followed by any of the node devices 51, 52, and 55. As explained previously, when benchmark values are the same, an additional randomly generated delay may be introduced in order to ensure that to node devices do not broadcast simultaneously which could result in collision of packets and hence loss of data.

If node device 52 is the first one to broadcast, it broadcasts 63 message 75 to its neighbouring node devices. Upon receiving the message, node devices 51 and 53 update the locally stored candidate listings as described previously. Presently candidate listings according to messages 78 and 79 are available at node devices 51 and 53, respectively. Shortly afterwards, node device 54 broadcasts 64 the message 76 to its neighbouring node devices. After broadcasting 64, the node devices 52, 53 and 55 have the candidate listings according to messages 80, 81 and 82 respectively. Consequently, any node device 52, 53, 55 may now be randomly selected to transmit the data to the requesting server. It is assumed that in the FBM process, node device 52 broadcasts 65 the updated message 80 after a waiting time 94. After the broadcast 65, all the node devices that performed an update of the locally stored candidate listing now have the same listing, i.e. A4B6; A3B4, identical to the one as established previously from looking to the figure by the person skilled in the art.

Node device 53, upon receiving the message 80 determines that the received candidate listing of message 80 is the same as the one that is locally stored 81. Hence no update is to be performed and it does not need to broadcast the message. Node device 51, upon receiving the message 80, decides that the locally stored candidate listing of message 78 is to be updated and message 83 is formed as described earlier. After a random waiting time, node device 51 will broadcast the message 83 to its neighbours, but since all the node devices have the same information, no further broadcasting here is done.

Therefore, it is seen that after merely five broadcasts, 61-65, with the method according to the present disclosure, all the node devices have the unchanged or static candidate listing comprising information regarding which two node devices have the best benchmark values. It may be noted that the description relating to FIG. 3 is merely an example and serves the purpose of further illustrating the steps of the method.

Asset or object tracking as explained above with reference to FIG. 3, may have two different scenarios:

(1) Live tracking: The tag on a tracked object reports its existence periodically. Each time the wireless network node devices receive the existence message, the location of the tag should be obtained on the network server.

(2) Tracking on demand: The tag on a tracked object reports its existence periodically. The neighbouring node devices only record its existence. When the network server wishes to know the location of the tag, it inquires the whole network for it.

For Live Tracking, a node device of the network initiates an FBM process by sending out a 'find-the-best-message' FBM inquire message with a blank candidate list. Message format 1 should be applied and AppOption may be omitted. In this case, the whole network will be involved in this FBM process.

In an embodiment of the present disclosure, AppOption may also be set to 'Neighbours Only', that is only neighbouring node devices of an initiating node should be involved. This means when a node device receives a new message which results in creating a new FBM item in its FBM table, it should check whether the source node device address of the message is equal to SrcAddr in the message. If yes, the node device should carry on as disclosed above; if no, the node device should ignore this message and does not put the FBM item into its FBM table.

This option significantly reduces the number of messages circulating in the network, especially when the network size is not small (e.g. >50 node devices). However, if the network node devices are installed very sparsely, this option could result in two or more sub-groups of neighbour node devices obtaining different results. But that can be easily solved at the server side, i.e. the server would receive a small number of different results from different node devices, and it could combine and truncate the results, as the server will have sufficient processing power, compared to the node devices having only limited processing power in general.

Figure 4:
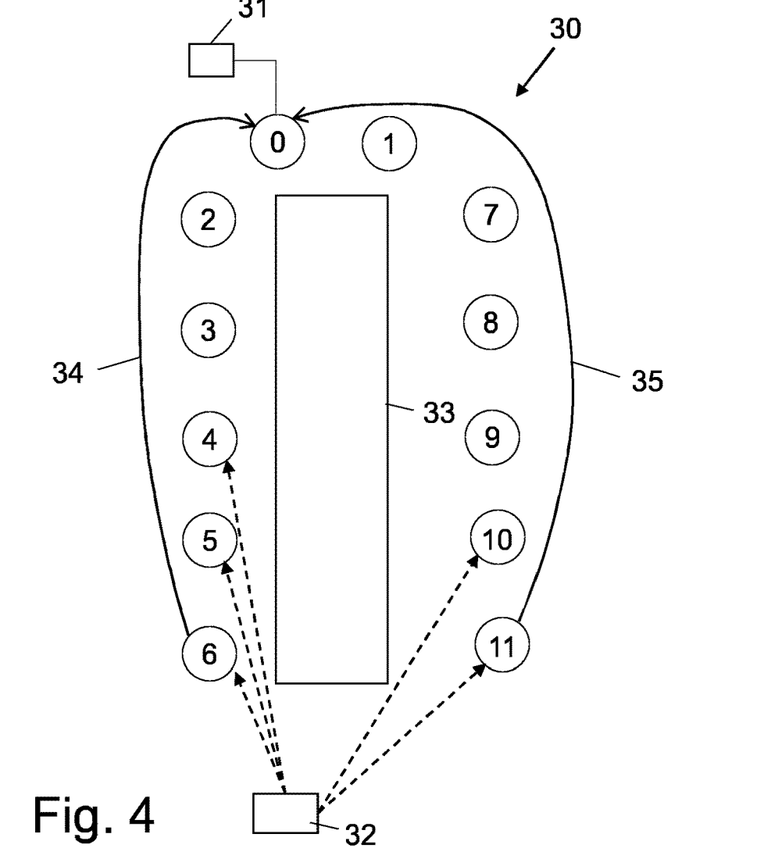
FIG. 4 schematically illustrates a further embodiment of the method according to the present disclosure.

FIG. 4 shows an embodiment for illustrating a further embodiment of the method according to the present disclosure. A network 30 is comprised of communicatively interconnected node devices 1-11 and a gateway node device 0 that connects to a server 31. It may be appreciated that in a network not all node devices may communicate directly with one another. For example, in FIG. 4, a concrete wall 33 separates two sets of node devices, a first set comprised of node devices 2, 3, 4, 5, 6 and a second set comprised of node devices 1, 7, 8, 9, 10, 11, for example. The concrete wall 33 provides a barrier to the radio waves, and the radio waves cannot penetrate the wall 33 easily or only very attenuated. A unit or tag 32 placed in a central location with respect to the wall 33, broadcasts a beacon signal to the node devices and is received by node devices 4, 5, 6 of the first set and node devices 10, 11 of the second set, for example. Schematically indicated by dashed arrows.

Assume again that an application running on the server 31 requests the addresses of four node devices in the vicinity of the tag 32, for determining the geographic location of the tag 32, for example. When applying the method according to the present disclosure, as outlined above with reference to FIG. 3, eventually node device 6 may return a candidate listing comprising node devices 4, 5, 6, and node device 11 may return a candidate listing comprising node devices 10, 11. Therefore the gateway node device 0 receives 34, 35 two mutually exclusive candidate lists from node devices 6 and 11. When such information is received, according to the present disclosure, the server 31 combines the two listings and selects the four best node devices from both listings. This is possible because of a higher processing capacity available at the server 31.

For calculating the position of the tag, MaxCandidateNum is recommended to be at least 3. After sending the initial message, the tag may go to sleep mode to save energy. When a neighbouring node device of the tag receives a message from the tag, which may be an initiating message of a location detection inquiry message, the benchmark of the local node device can be set to the Received Signal Strength Indicator, RSSI, value; a node device which receives a stronger incoming message should have a higher RSSI value for this message. This benchmark value should be stored in $M_{img}$ when $M_{img}$ is initiated.

When a non-neighbour node device starts the FBM process and the 'Neighbours Only' option is not applied, the candidate list in $M_{img}$ should be blank when $M_{img}$ is initiated.

When the FBM process has finished, if the 'Neighbours Only' option is applied, the node device which has been put at the top of the candidate listing should send the candidate listing to the gateway node device for the calculation of the tag's position.

When the FBM process has finished, and the 'Neighbours Only' option is not applied, the gateway node device should have already got the candidate list during the process. The gateway node device uploads the candidate list to the server, so that the server can calculate the position of the tag according to the RSSIs of the neighbouring node devices and their corresponding coordinates.

Optionally, every node device may record its own coordinates, and put them in Payloadn in the candidate listing. Therefore, the gateway and the server may obtain the coordinates from the candidate list rather than have to inquire an additional database of node device coordinates.

For Tracking on demand, the tag periodically sends out beacon messages. These beacon messages are not part of the FBM process. The ID of the beacon, BID, and a sequence number, BSeqN, should be included in a beacon message. BSeqN is different to a SeqN in an FBM message, which is used to identify different FBM processes. When having received a beacon message, the network node devices record BID, BSeqN, and the RSSI of the message. New messages from the same beacon node device may overwrite its old records.

The server may initiate a FBM process via the gateway node device. The gateway node device sends the first FBM inquiry message:

Message format 1 should be applied.

The BID of the tag should be included in AppOption.

MaxCandidateNum is recommended to be at least 3 for calculating the position of the tag. Although lower numbers may be used, it is common understanding that by using at least three candidate node devices, the position of a tag may be accurately determined. Benchmarkn contains two parts, BSeqN and RSSI. BSeqN have the higher priority, as an older sequence number indicates an expired location information.

When the FBM process has finished, the server may carry on the location calculation according to the candidate list stored in the gateway node device's, $M_{img}$. It should be noted that if a tag sends a new beacon message in the middle of an FBM process, the new record of this tag should not be used. The latest record at the time when a node device received the first FBM message of the FBM process should be used throughout the whole FBM process. This, to avoid a non-convergent result to the process if the tag is quickly moving around and sending beacons at a relatively high rate.

Another application applying the method of the present disclosure is Approaching Control of a remote controller, for example. Approaching control may be considered as a variant of live asset tracking, where the remote controller replaces the tag on the tracked object. Rather than obtaining the location of the tag, the selected candidate(s) execute(s) a command from the remote controller. Usually, MaxCandidateNum is set to 1 for this application.

The contents of the command may be stored in AppOption. Alternatively, for an ultra-low-power controller, it may only put the key ID, which means the ID code representing which key has been pressed by the user, in AppOption, so that the packet length can be shorter to reduce the required energy to send the packet. The corresponding command linked to the key ID should be assigned on all node devices (which are not ultra-low-power) beforehand.

Another feature which may be included in AppOption is to specify some additional conditions on which node device or node devices can execute the control command. For example, it may specify that those node devices which have already executed the same command should be excluded in the candidate listing, i.e. these node devices may involve in the FBM process to relay or route messages, but they cannot be included in the candidate listing. A controller may send a command like 'turn on the nearest light, excluding those already on', which means to turn on the nearest light of those which are currently off. If a user stays in a fixed position with a controller, and continuously clicks the button to send a few commands like this, the lights surrounding the user would turn on one by one at each time the button is clicked.

A distributed storage application may have two different scenarios:

(1) Locate a free memory space in a node device for a new record: The application tries to find one or several suitable node devices which have enough memory space and close-enough physical location to store a record of data, or a new version of a record of data.

(2) Find the location of a valid record: The application tries to locate a node device which contains the latest version of the required record.

Other processes of distributed storage, e.g. transmitting data between the application node device and the storage node device can be implemented by conventional methods.

To locate a free memory space for a new record, the application node device initiates the FBM process by sending out an FBM inquiry message:

Message-Format-1 should be applied.

AppOption should at least contain the required memory size of the new record of data.

AppOption may include a record ID which uniquely represents the type of the record, so that those node devices which contain the older version of the record can re-use the space.

MaxCandidateNum can be either 1 or a larger value if the application wishes to store several copies of the data record.

Optionally, AppOption may include other information to benchmark the suitability of the candidates. For example, those node devices involved in the application are preferred; or the node devices with a certain feature or group ID are preferred; or the node devices with less hop numbers to the initiating node device are preferred as candidates.

During the FBM process, the available memory size is a mandatory benchmark. Other factors can be optionally included to calculate Benchmarkn, for example, whether matching a certain pattern mentioned in AppOption, or the number of hops from the application node device. When the FBM process has finished, the application node device knows the destination to store the data record from the candidate list.

To find the location of a valid record, the application node device initiates the FBM process by sending out an FBM inquiry message:

Message format 1 should be applied.

AppOption should at least contain the record ID which uniquely represents the type of the record.

During the FBM process, the version number is a mandatory benchmark. Other factors can be optionally included to calculate Benchmarkn, for example the number of hops from the initiating application node device. When the FBM process has finished, the initiating application node device knows the resource node device which obtains the data record according to the candidate list.

As mentioned in previous paragraphs, the proposed invention is able to solve the challenge of collecting the list of missing parts after a grouped Over-The-Air, OTA, data or software upgrade by broadcasts. That means, the source node device of the OTA upgrade sends out the upgrade image file by a long series of broadcast packets, then the source node device has to know which parts have been missed by one or a few node devices in the network so that the source node device may resend them again.

The key idea to solve this is to define AggregatedPayload in Message format 2. An implementation may divide the upgrade image file into a lot of pieces, or packets, each of which is represented by a bit in AggregatedPayload. Consequently AggregatedPayload is a bitmap of the image file. Any missing parts can be labelled on the bitmap as the missing-part list.

For example, assuming a 128 kB image file is divided into 512 parts, each of which contains 256 Bit of the image data. The 512 parts can be represented by a 512-bit bitmap (64 Bytes) as AggregatedPayload. A 'zero' on a certain bit positions means that the corresponding 256 Bit have been successfully received, and a 'one' means that a respective one has been missed during the grouped OTA. The FBM process may be defined as:

After having sent the upgrade image file, the source node device may initiate the PBM process by sending the first FBM inquiry message:

Message format 2 should be applied.

AggregatedPayload is the bitmap as explained above. Every bit is set to zero in the first FBM message.

AppOption may include an offset value of the bitmap if the whole bitmap is too long to be included in a single FBM message and FBM process. For example, an offset of 16 and a 64-bit long AggregatedPayload means the bitmap portion from the 16th bit to the 79th bit.

At the first time when a network node device receives the FBM message, it firstly generate a local bitmap according to what it missed in the image file. Any missed part may be represented by a 'one' on the corresponding bit in AggregatedPayload. The local bitmap is then combined with the incoming bitmap by bit-OR, and resent later by a new FBM inquiry message. During the propagation of the FBM messages across the network, if the incoming AggregatedPayload is different to the one stored locally in $M_{img}$, they should be combined by bit-OR.

After enough message exchange among the network node devices, the on-going AggregatedPayload will converge to an unchanged version, as explained above with the candidate listing in FIG. 3, which is the final bitmap which represents every missing part by the network node devices.

If AppOption has the offset parameter and the AggregatedPayload only contains part of the whole bitmap of the image file, the source node device may initiate one or more FBM processes to carry on colleting the missing-part list. The source node device resend a series of broadcast packets containing the missing parts, and redo the above steps to collect the list of the newly missed parts again, and so on, until all parts have been successfully received by all node devices.

Those skilled in the art will understand that the ID data identifying information to be located alternatively may be included in the listing of candidate node devices. This alternative is understood to be included by the appended claims.

If ZigBee is the network to implement the method according to the present disclosure, the FBM process should be managed at the Application Layer level in a device protocol. This, because it is application-dependant whether to update FBM inquiry messages.

At Network Layer level of ZigBee, every FBM message is implemented as a broadcast message to all node devices with the broadcast radius as 1. That means, this message is to be sent only within one hop, i.e. any one of its neighbour node devices does not relay the message.

Here an additional modification to the ZigBee stack should be applied—If an incoming broadcast message has a radius of 1 and its MAC address is equal to its network source address, the network layer does not need to set a new Broadcast Transaction Record, BTR, in its Broadcast Transaction Table, BTT. Meanwhile, the contents of this message should be reported to the higher layers of the Network Layer.

This modification is to avoid overflow on BTT, as each FBM process would generate a large number of different broadcasts, at least one for each node device. So each node device would receive the broadcasts at least as many as its neighbours, which are easily to be greater than the size of BTT.

On the other hand, those broadcasts with radius=1 would not be relayed anyway, and it is not necessary to create a BTR for the future to filter repeated broadcasts. Those retried broadcast messages from the same node device can be filtered by the presented algorithm in Procedure-B, which is described above in the detailed description section. This modification does not affect the compatibility to ZigBee standard.

Similar to ZigBee, Bluetooth Low Energy, BLE, Mesh should manage the FBM process at the Application Layer level, and its counterpart to radius of ZigBee, i.e. Time-To-Last, TTL, should be set to 1 as well. If BLE Mesh manages a table on each node device to record the on-going flooding messages in the network, the FBM messages need not to be recorded in the table, too.

A group of non-meshed BLE node devices may also implement the present disclosure, by sending FBM inquiry messages as non-connectable advertising messages. Other node devices may receive these messages in Scanning mode.

Figure 5:
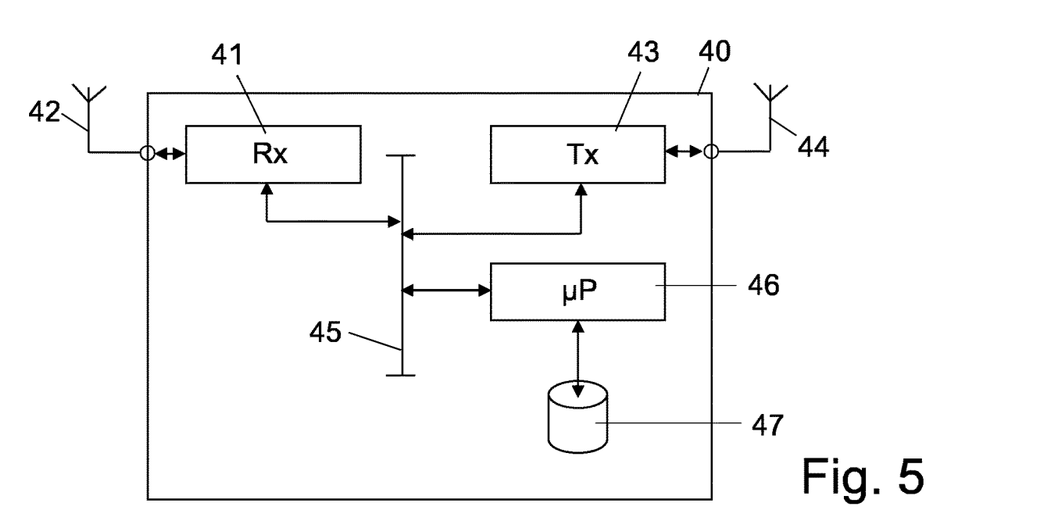
FIG. 5 shows a simplified embodiment of a node device arranged for operating in accordance with the method of the present disclosure.

FIG. 5 shows an embodiment 40 of a network node device arranged to perform a method according to the present disclosure. The network node device 40 may be arranged for controlling a luminaire or fixture, a luminous wall panel, a sensor, a switched and the like, when used in lighting systems, for example. Of course, other devices may be controlled, not limited to lighting systems related application. In general, a node device 40 may operate as node devices in an Internet-Of-Things, IOT, local network, for example.

The node device 40 generally comprises a receiver, Rx, 41 and antenna 42, which are arranged to receive incoming signals from nearby node devices or to receive requests for information from a server (not shown in figure) running an application or a program, or a terminal device, such as a Tx-tag attached to an object, for example. Once a message or an instruction has been received by the node device 40 through the receiver 41, under control of a data processor 46, such as a microprocessor, μP, the node device 40 is arranged for processing, storing and exchanging the information with other nearby node devices or the with the server from which the request originated. The processor 46 is arranged for executing the method according to the present disclosure.

The processor 46 may perform the steps of an FBM process as elucidated above, wherein the data processing, data storage and exchange of messages and information to be located in the node device 40 is configured in accordance with a cross-layered data processing and data transport model, at least comprising a network layer level and an application layer level. In such a cross-layer protocol, the network-layer transmission is effectively affected and modified by the application layer, whereas the application-level processing at the network node device dynamically updates the broadcast content of an inquiry message, while the network-level processing distributes the inquiry message across the network.

Furthermore, the node device 40 comprises a data memory or storage 47 arranged for storing information and other data, such as benchmark data, candidate listings, aggregated payload information, etc. as required for performing the method according to the present disclosure. The memory 47 may also store a computer program which, when executed by the processor 46, causes the node device 40 to perform the method according to the present disclosure. The node device 40 also comprises an internal data bus 45, arranged for transfer of data between its various internal modules.

Transmitter, Tx, 43, and antenna 44 are arranged, among others, for broadcasting inquire messages to neighbouring node devices in a network of communicatively interconnected node devices. It may be understood that both the receiver and transmitter may receive/transmit data wirelessly and/or operate in a wired network in accordance with, but not limited to, communication protocols generally available and known as ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (based systems).

In a wireless mesh network, WMN, the node devices typically communicate in broadcast mode, using the Bluetooth Low Energy, BLE, mesh protocol or the ZigBee protocol, for example. A so-called combo-node device, with both ZigBee and BLE connectivity, may operate as a temporal bridging node between a mobile phone and a ZigBee-based lighting network, for example.

It will be understood by those skilled in the art that the receiver 41 and transmitter 43 may be arranged as a single transceiver circuit, having a single Rx/Tx antenna (not shown).

According to the present disclosure, a node device in a network, such as a mesh network, receives an inquiry message of the type 'find the best match' for information to be located at a node device, comprising benchmark data relating to the information to be located, and updates the message based on a comparison of the content in the latest received message and the node's locally stored information (the local copy). The locally stored information is derived from previous received messages from other devices in the network. When no update is required, no message is broadcasted by a node device and the local copy at the node devices involved converges to a static content from which the information sought can be located.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope thereof.

The invention claimed is:

1. A method of locating information available at a network node device in a network comprising a plurality of wireless communicative connected node devices, wherein a node device comprises information to be located, benchmark data pertaining to said information characterizing said information to be located and ID data identifying said node device, said method comprising the steps of:
   a) receiving, at a node device of said network, an information location inquiry message, said inquiry message comprising ID data identifying information to be located and a listing of candidate node devices of said network having information to be located by said inquiry message, said received listing comprising ID data identifying a candidate node device and benchmark data pertaining to said information to be located available at a respective candidate node device;

b) starting an inquiry process, at said node device of receiving said information location inquiry message, based on said received inquiry message, by updating said received listing based on said benchmark data of said received listing and benchmark data pertaining to said information to be located available at said node device, said updated listing comprising ID data identifying said node device of receiving said information location inquiry message and benchmark data pertaining to said information to be located available at said node device of receiving said information location inquiry message;

c) storing said updated listing at said node device of receiving said information location inquiry message, and d) broadcasting, by said node device of receiving said information location inquiry message, said inquiry message comprising said stored listing.

2. The method according to claim 1, wherein at said node device of receiving said information location inquiry message for a respective inquiry process a received listing of candidate node devices is matched with a stored listing of candidate node devices, and in case of a match no updated listing is established.

3. The method according to claim 1, wherein said inquiry message comprising said stored listing is broadcasted by said node device of receiving said information location inquiry message after a waiting time.

4. The method according to claim 3, wherein said waiting time is randomly set among said node devices of receiving said information location inquiry message of said network or said waiting time is set based on said benchmark data of a node device included in said listing of candidate node devices in said inquiry message to be broadcasted.

5. The method according to claim 1, wherein after broadcasting said inquiry message comprising said stored listing, another information location inquiry message of said inquiry process may be received by said node device of receiving said information location inquiry message after a set time period, and wherein said inquiry process at said node device of receiving said information location inquiry message is terminated when no further inquiry messages are received by said node device of receiving said information location inquiry message within said time period.

6. The method according to claim 1, wherein said inquiry message relating to an inquiry process is established at an initiating node device.

7. The method according to claim 6, wherein said initiating node device is a node device of said network locating a terminal device that periodically reports existence data in said network for locating said terminal device wherein said inquiry message is established comprising a blank listing of candidate node devices.

8. The method according to claim 6, wherein said inquiry message is established at said initiating node device comprising ID data identifying said initiating node device and wherein said inquiry message is broadcasted comprising ID data identifying said broadcasting node device, wherein an updated listing of candidate node devices is established at said node device of receiving said information location inquiry message only in case said ID data of said initiating node device and said ID data of said broadcasting node device are identical.

9. The method according to claim 1, wherein said listing of candidate node devices is limited to comprise a maximum number of candidate node devices to be included in said listing of candidate node devices.

10. The method according to claim 1, wherein said listing of candidate node devices further comprises payload data pertaining to content of said information to be located available at a candidate node device.

11. The method according to claim 1, wherein the inquiry message comprises at least one parameter for controlling processing of an inquiry message at a node device of said network.

12. A system comprising a network comprising a plurality of node devices, a node device comprising a processor arranged for data processing, a data storage arranged for storing information, benchmark data pertaining to said information, ID data identifying said information, ID data identifying said node device, and a listing of candidate node devices relating to an inquiry process, and a transceiver, wherein said node devices, are operatively arranged for performing the method according to claim 1.

13. The system according to claim 12, wherein at least one of said node devices is arranged as a gateway node device for operating as an initiating node device of said system.

14. A node device arranged for operating in the system of claim 12, said node device being arranged for operating in accordance with one of a ZigBee and a Bluetooth Low Energy, BLE, data processing protocol.

15. A computer program product, comprising a computer readable storage medium storing instructions which, when executed on at least on one processor, cause said at least one processor to carry out the method according to claim 1.

* * * * *